(12) United States Patent
Dillingham

(10) Patent No.: US 6,327,608 B1
(45) Date of Patent: Dec. 4, 2001

(54) SERVER ADMINISTRATION TOOL USING REMOTE FILE BROWSER

(75) Inventor: Lara N. Dillingham, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/161,343

(22) Filed: Sep. 25, 1998

(51) Int. Cl.⁷ .................................................. G06F 15/16
(52) U.S. Cl. ........................ 709/203; 709/217; 709/219
(58) Field of Search .................................. 709/203, 201, 709/216, 217, 219, 220, 221, 223, 224

(56) References Cited

U.S. PATENT DOCUMENTS

| | | | |
|---|---|---|---|
| 5,944,780 | 8/1999 | Chase et al. | 709/201 |
| 5,995,756 | 11/1999 | Herrmann | 709/221 |
| 6,101,558 | 8/2000 | Utsunomiya et al. | 710/6 |
| 6,115,741 | 9/2000 | Domenikos et al. | 709/217 |

OTHER PUBLICATIONS

Eric Lease Morgan, "Scripting WWW Browsers" http:emorgan.lib.ncsu.edu/teaching/manuscript/0700–0002.html, Jun. 1996.

*Primary Examiner*—Mehmet B. Geckil
(74) *Attorney, Agent, or Firm*—Lee & Hayes, PLLC

(57) ABSTRACT

A system architecture enables remote browsing and administration of physical file directories resident on a server from a remote client browser. The architecture has a browser and a user interface (UI) resident at a client. From the UI, the remote administrator can specify a path of a physical file directory in a file system located at the server. The browser sends an HTTP request that includes the path to the server. A server-side script receives the client request and invokes a file system object to enumerate the files and/or folders for the directory path specified in the client request. The server-side script then creates a client-side script, which when executed at the client will instantiate a custom client-side object to cache the directory data and to present that data in a dialog UI. The server returns the client-side script and directory data to the client, wherein the script is subsequently executed to instantiate a local object to cache the directory data. Using the client UI, the remote administrator can view the directory data, navigate the data, set properties for the listed files or folders, add or rearrange directories, delete or move files, or perform other general administration tasks.

23 Claims, 5 Drawing Sheets

SERVER ADMINISTRATION TOOL USING REMOTE FILE BROWSER

TECHNICAL FIELD

This invention relates to servers for computer network systems and to server administration tools. More particularly, this invention relates to remote administration of server file systems using remote HTTP-based browsers as the administration access portal for browsing and configuring directories in the file systems.

BACKGROUND OF THE INVENTION

A computer network system has one or more host network servers connected to serve data to one or more client computers over a network. Clients send requests for data and/or services to the servers over the network. The servers process the requests and return responses to the clients back over the network.

In the Internet setting, the clients typically execute a browser program that submits requests using conventional HTTP (Hypertext Transfer Protocol) request commands. Each Internet server runs a Web server software program that accepts HTTP requests and returns data in the form of Web pages or documents. The Web pages are commonly written in HTML (hypertext markup language) or XML (extensible markup language) and may include text, images, sound, video, active code, and so forth. The server transmits the Web pages back to the requesting client using standard HTTP response commands. The client browser renders the Web page into human-perceptible forms.

The Web pages and other program files, such as Active Server Pages (ASP) applications or custom programs, are stored and organized at the server in directories. Each Web site consists of one or more directories that contain the content files (typically the home page, images, etc) and programs. In general, a site administrator can define two different types of directories: physical directories and virtual directories. A physical directory is subdirectory of the Web site's specified, or home, directory. A virtual directory is any directory not contained within the home directory. Virtual directories are typically used to specify different URLs (Uniform Resource Locators) for different parts of the Web site.

Site administrators have traditionally used local server-based administrative tools to browse and configure the files and directories. The administrators are typically present at the server and can easily browse and configure the directories using a familiar user interface. Many administrative tools that are available today also support remote administration that allows an administrator to browse and lo configure directories on the server from a remote computer on the network, rather than from the server itself.

Web site administrators would like to be able to configure the site directories from a remote client over the Internet. However, remote administration over the Internet raises a host of problems. One problem concerns the inability to browser the server's physical files and directories from a remote computer over the Internet. There is no reliable means of determining what physical files and directories are located on the Web server. A remote administrator can enter a virtual path name, such as a URL like "www.microsoft.com\applications", but the administrator has no ability to browse the physical directories on the Web server file system, such as documents listed in the physical directory "C:\". To view specific physical directories and set valid configuration parameters, a remote administrator must know the entire path and exact name of the file on the server in advance.

Another problem that compounds the difficulty of remote administration of the Internet is that many Web sites implement firewall protection that blocks many types of inquiries from reaching the Web server. Typically, firewall software only permits HTTP requests to pass through to the Web server, while blocking other requests. In addition, the proxy server also prevents machines from inside the firewall from directly communicating with, or seeing, the client browser, thus making authentication very difficult. While conventional administrative tools support remote administration over local networks, they do not solve the problem of browsing directories over an HTTP firewall/proxy server.

Another concern is security. Allowing access to a Web site's files and configuration parameters may be dangerous in the absence of high security and authentication procedures.

Accordingly, there remains a need for a remote administration tool that enables remote management of a server's file directory over the Internet, through a firewall, and in a secure manner.

SUMMARY OF THE INVENTION

This invention concerns a system architecture that enables remote browsing and administration of physical file directories resident on a server from a remote client browser. The system architecture employs standard network protocol, such as HTTP, to enable implementation on the Internet.

The architecture has a browser and a user interface (UI) presented at a client. The UI might be stored locally at the client, or downloaded on demand from the server. The client UI presents files, folders, and/or directory trees that are cached locally at the client to a remote administrator. The administrator can navigate the files and/or folders of the currently cached directory path using file browsing tools. The remote administrator can also select a file or folder, or specify a new path of a physical file directory located at the server.

When the administrator designates a new path that is not cached at the client, the browser sends a client request that includes the new path to the server. The request conforms with standard HTTP. In this manner, the file browsing request is protected within an authenticated communication path (i.e., one that has already been secured) and is granted passage through any firewall that may exist between the client and server.

The server receives the client request and invokes a file system object used to interface the file system. The file system object enumerates the files and/or folders for the directory path specified in the client request.

The server then creates executable code that will be run at the client to cache and present the directory data obtained by the file system object. In one implementation, a server-side script creates a client-side script, which instantiates a custom client-side object to cache the returned directory data and to present that data in a dialog UI. Absent this process, the client-side browser would not know what files, folders, and/or directories it will cache in order to present them in response to the specified path query. The server thus prepares a client-side script that will be able to cache the information for the client and downloads that script to the client for execution.

The server returns the client-side executable and the directory data to the client. The client subsequently executes the script to instantiate a local object for caching the directory data. The data is presented in the UI, which enables the administrator to navigate the data, set properties for the listed files or folders, create or rearrange directories, delete or move files, or perform other general administration tasks.

BRIEF DESCRIPTION OF THE DRAWINGS

The same reference numbers are used throughout the figures to reference like components and features.

DETAILED DESCRIPTION

This invention generally pertains to a system architecture that enables remote administration of a server-based file directory from a remote client browser using a standard network protocol, such as HTTP. The system architecture is particularly useful for remote administration over the Internet and through one or more firewalls. Additionally, the system architecture enables the administration tasks to be performed securely over an otherwise public network.

For discussion purposes, this invention is described in the context of a Web server application tailored for serving documents and programs over the World Wide Web. Remote administration of the Web server involves configuring and organizing Web pages into a hierarchy of file directories. As one example, the Internet Information Server (IIS) manufactured and marketed by Microsoft Corporation is a Web server that is extremely configurable and can serve thousands of files. One aspect of this invention concerns the ability to browser the directories of the Web server, such as IIS, from a client browser.

General Architecture

Figure 1:
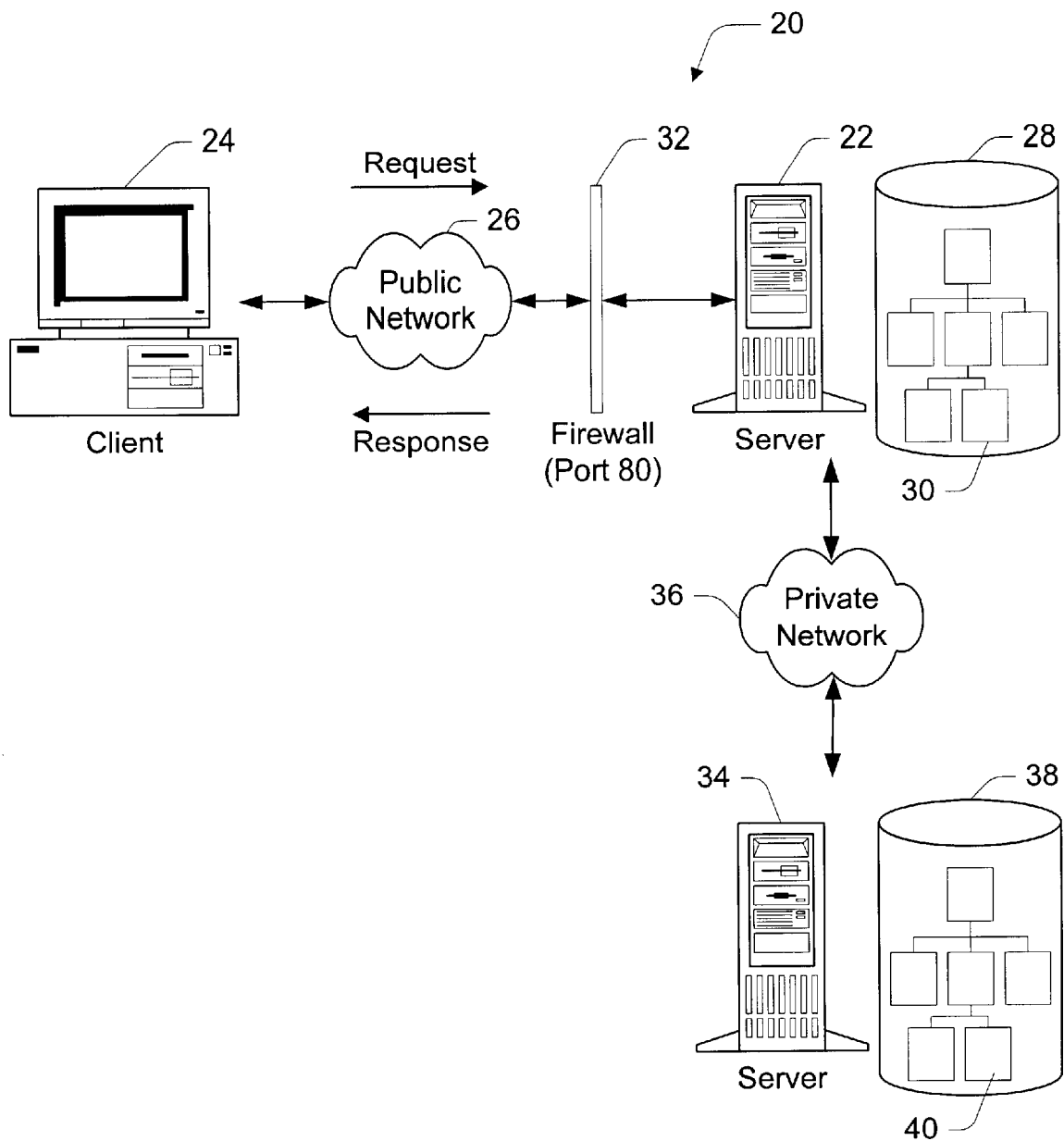
FIG. 1 is a diagrammatic illustration of a client-server system showing remote administration of a server file directory over a public network, such as the Internet.

FIG. 1 shows a simple client-server computer network system 20 with a host network server 22 connected to serve data to a client 24 via a public network 26. In typical operation, the client 24 sends a request for data and/or services to the server 22 over the public network 26. The server 22 processes the request and returns a response over the public network 26. If the request is for data, the server 22 accesses a database 28 to retrieve the requested data 30 and returns the data 30 as part of the response.

The client-server system 20 is representative of many different environments. One particular environment of interest is the Internet. The server 22 runs a Web server software program that establishes a Web site on the World Wide Web. The server 22 has a file system that organizes files, such as Web pages and other documents 30, into hierarchical directories. The Web server accepts requests transmitted over the Internet from a client-based browser program. The server processes the requests and returns one or more Web pages to the client 24. The Web pages are commonly written in HTML (hypertext markup language) and XML (extensible markup language) and are transmitted using conventional network protocols, such as TCP/IP (Transmission Control Protocol/Internet Protocol), HTTP (Hypertext Transfer Protocol) and DCOM (Distributed Component Object Model). The client browser renders the Web page into human-perceptible forms.

The server computer 22 may implement a firewall software program 32 to protect the Web site. The firewall 32 is executed on the server computer or a dedicated computer, but is shown separately for illustration purposes. The firewall 32 blocks many types of unwanted inquiries from arriving at the Web server. The firewall 32 is conventional in that it permits passage of messages conforming to standard protocols, such as HTTP, that arrive at well-known and designated ports, such as port 80. It is noted that other firewalls may be implemented in the communication path between the client and the server, such as a firewall implemented on the client side of the Internet 26.

The server 22 may be connected to an internal computer network behind the firewall 32. In the FIG. 1 illustration, the server 22 is connected to a second server 34 via a private network 36 (e.g., LAN, WAN). The second server 34 has its own database 38 with files 40 stored therein. The server 34 has a file system that organizes the files 40 into hierarchical directories.

According to an aspect of this invention, a computer network system 20 implements a remote file administration architecture that enables the client 24 to browse and manage the server-based file directories remotely over the Internet 26 and through the firewall 32. The architecture has software components residing at both the client and server and these components empower the client to perform such administrative tasks as browsing and listing the file directories, configuring the directories, moving existing files, creating new files, and so on. The administration architecture utilizes standard HTTP commands to gain passage through the firewall 32. In addition, the architecture can be extended to allow the client to browse the directories 40 of another server 34 via the proxy server 22.

The architecture and processes implemented by the architecture are described below in more detail, following a brief discussion of an exemplary computing system used to implement the client and/or server computers.

Exemplary Computing System

Figure 2:
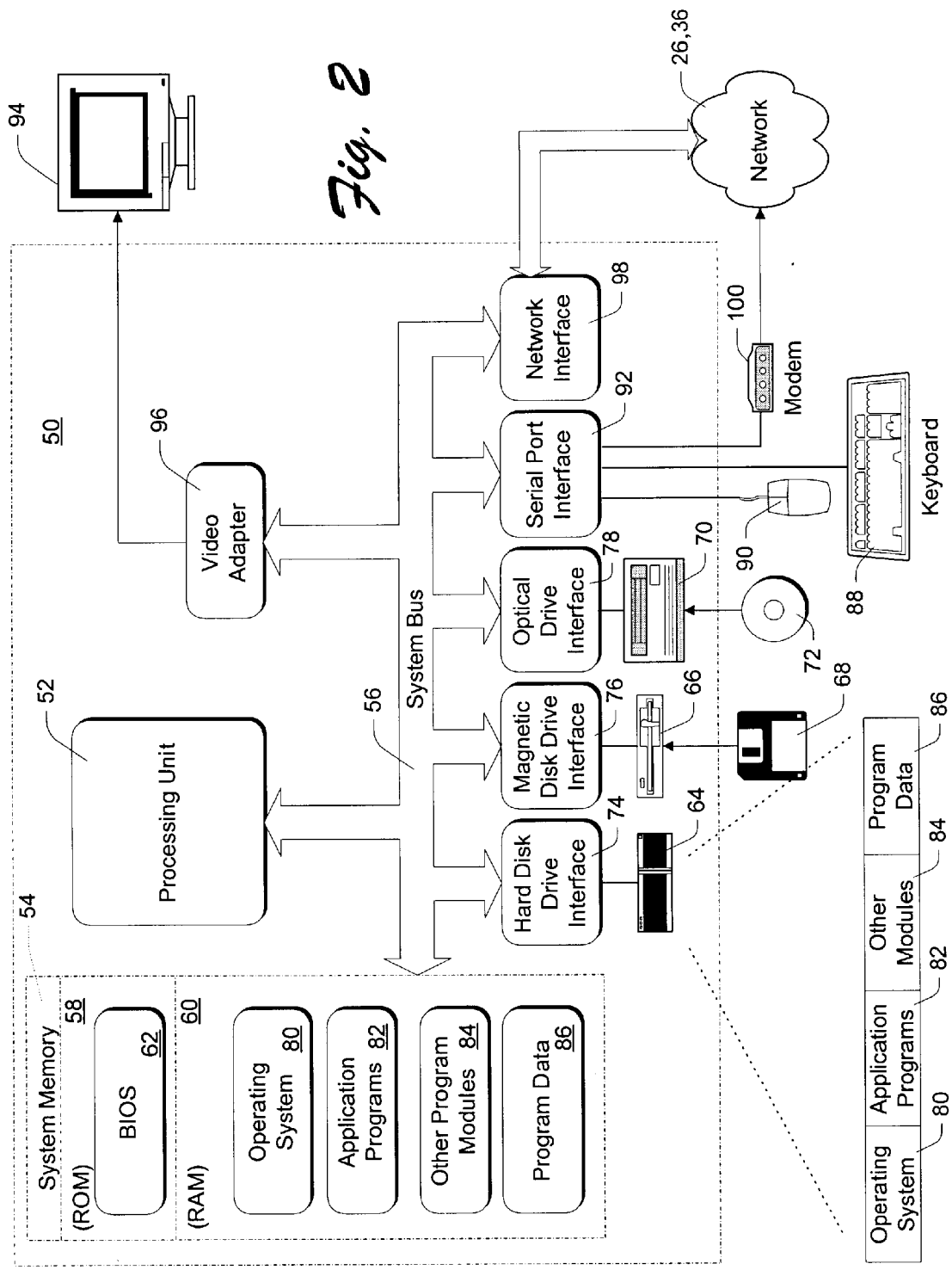
FIG. 2 shows a block diagram of a computer that can be used to implement the client and/or the server in the client-server system.

FIG. 2 shows an exemplary computing system for implementing aspects of the invention. The computing system is shown embodied as a general purpose computing device in the form of a conventional personal computer 50. The computer 50 includes a processing unit 52, a system memory 54, and a system bus 56 that interconnects various system components, including the system memory 54, to the processing unit 52. The system bus 56 may be implemented as any one of several bus structures and using any of a variety of bus architectures, including a memory bus or memory controller, a peripheral bus, and a local bus.

The system memory 54 includes read only memory (ROM) 58 and random access memory (RAM) 60. A basic input/output system 62 (BIOS) is stored in ROM 108.

The computer 50 may also have one or more of the following drives: a hard disk drive 64 for reading from and writing to a hard disk or hard disk array; a magnetic disk drive 66 for reading from or writing to a removable magnetic disk 68; and an optical disk drive 70 for reading from or writing to a removable optical disk 72 such as a CD ROM or other optical media. The hard disk drive 64, magnetic disk drive 66, and optical disk drive 70 are connected to the system bus 56 by a hard disk drive interface 74, a magnetic disk drive interface 76, and an optical drive interface 78, respectively. The drives and their associated computer-readable media provide nonvolatile storage of computer readable instructions, data structures, program modules and other data for the computer 50. Although a hard disk, a removable magnetic disk 68, and a removable optical disk 62 are described, other types of computer readable media can be used to store data. Other such media include magnetic cassettes, flash memory cards, digital video disks, Bernoulli cartridges, random access memories (RAMs), read only memories (ROM), and the like.

A number of program modules may be stored on the hard disk, magnetic disk 68, optical disk 72, ROM 58, or RAM 60. These programs include an operating system 80, one or more application programs 82, other program modules 84, and program data 86. The operating system 80 is preferably a Windows brand operating system from Microsoft Corporation, such as Windows 98 or Windows NT, although other types of operating systems may be used, such as Macintosh and UNIX operating systems.

An operator may enter commands and information into the computer 50 through one or more input devices, such as a keyboard 88 and a mouse 90. Other input devices (not shown) may include a microphone, joystick, game pad, satellite dish, scanner, or the like. These and other input devices are connected to the processing unit 52 through a serial port interface 92 that is coupled to the system bus 56, but may alternatively be connected by other interfaces, such as a parallel port, game port, or a universal serial bus (USB). A monitor 94 or other type of display device is also connected to the system bus 56 via an interface, such as a video adapter 96.

The computer 50 operates in a networked environment using logical connections to one or more remote computers. The computer 50 has a network interface or adapter 98, a modem 100, or other means for establishing communications over a network, such as the Internet 26 or the private LAN 36. It will be appreciated that the network connections shown are exemplary and other means of establishing a communications link between the computers may be used.

Remote File Administration Architecture

Figure 3:
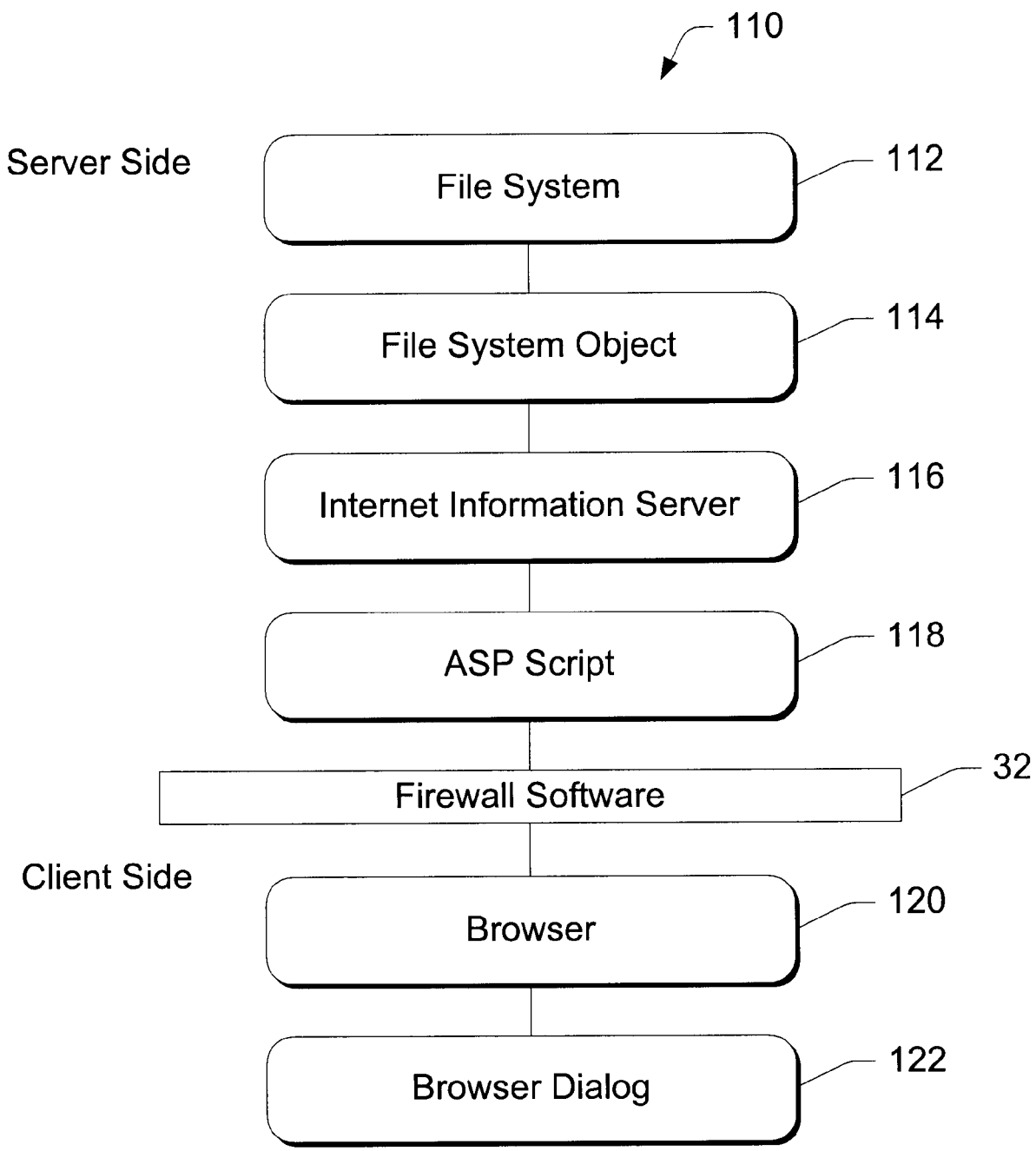
FIG. 3 shows a remote file administration software architecture according to an aspect of this invention.

FIG. 3 shows a remote file administration architecture 110 implemented in the client-server system 20 of FIG. 1. The architecture 110 includes software components resident at the server 22 and software components resident at the client 24. The software components can be incorporated into respective operating systems 80, or implemented as separate applications 82 or program modules 84, at the server and client.

On the server side, the remote file administration architecture 1 10 includes a file system 112 and a file system object 114 that is invoked to discover the file system 112. The server-side components further include the Internet Information Server 116 and a script 118 implemented using active server page (ASP) technology. The script is used to parse incoming requests to browse or configure the file directories and to create a client-side script that is downloaded back to the client in response to the requests. It is noted, however, that the server may alternatively implement code forms other than scripts (e.g., compiled code) to implement the functionality described herein with respect to script 118.

On the client side, the remote file administration architecture 110 includes a browser 120 and a browser dialog 122. In one implementation, the browser dialog 122 is built using a combination of server-side ASP files written using VBScript and client side scripts written in JavaScript. In one implementation, the ASP files include:

1. jsbrwls: A file to display a list of files or folders in a requested path;
2. jsbrwflt: A file to display the currently selected file name, as well as the ok and cancel buttons;
3. jsbrwcl: A file to implement the close function of the dialog;
4. jsbrwpop: A file that implements the open function of the dialog;
5. jsbrowser.asp: A file to display the dialog frames (layout);
6. jsbrower.js: A file containing the client-side utility functions, such as selecting a file, and sorting the lists;
7. jsbrwset.asp: A file that creates the cached list of folders and files in a requested path; and
8. jsbrwhd.asp: A file that displays the currently selected path as well as the column headers.
9.

The remote file administration architecture is incorporated into existing HTTP browsing tools, rather than being embodied as a self-contained binary executable. Incorporating the functionality into the existing browser allows use of high-level Internet authentication schemes to ensure secure access to the Web server's files.

Remote File Browsing

Prior to gaining access to the server file system, the client first establishes a secure connection with the server. This involves an authentication process in which the client and server verify each other's identities and software components (if desired) followed by encrypted communication over the Internet. When the client first attempts to connect, the server offers one or more authentication procedures. For Windows NT connections, the server offers three choices: basic authentication, NTLM (NT LAN Manager), and certificates. The client elects one of the three choices depending upon which its networking system can support.

Assuming the client elects the certificates option, the client and server exchange certificates. These certificates typically contain an identity, a public key, and a digital signature of a trusted certifying authority. If the certificates are verified, the client and server use the other's public keys to encrypt and decrypt messages exchanged between them.

The remote file administration architecture operates within the context of this secured environment. Accordingly, the commands described below for passing path names to the server and returning client scripts and data objects to the client are all securely exchanged over the Internet and through the firewall.

Figure 4:
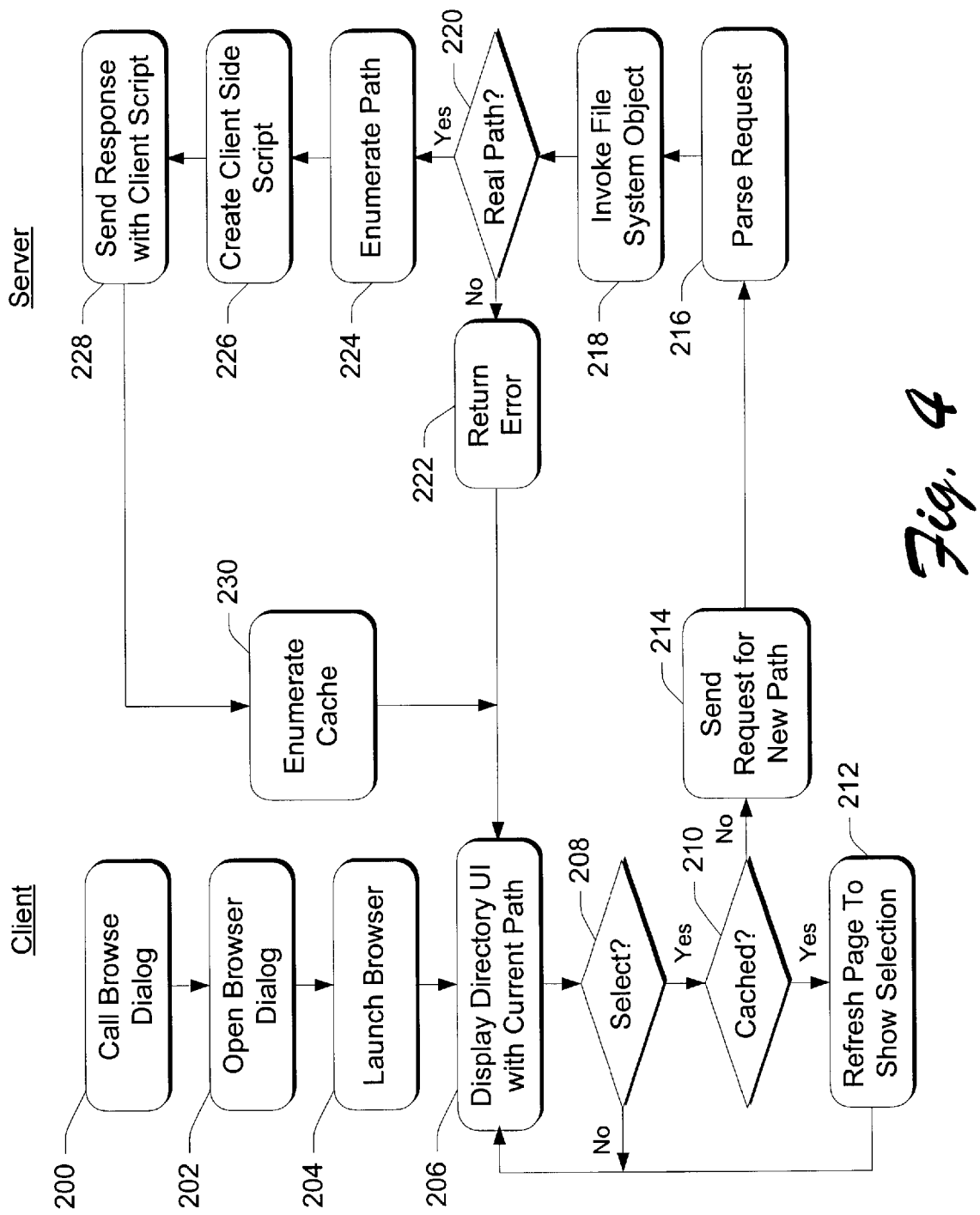
FIG. 4 shows steps in a method for remotely browsing a server-based file system from a client browser according to another aspect of this invention.

FIG. 4 show steps in a method for remotely browsing and administering file directories in the server-side file system 112 from the client browser 120. The steps are described in conjunction with the system of FIG. 1 and the software architecture of FIG. 3. The steps are performed by various software components at the client and server, as designated by the corresponding captions in FIG. 4.

At step 200 in FIG. 4, the client calls the browser dialog 122 by including the script library and initializing a browser object, as follows:

<SCRIPT SRC="Browser/JSBrowser.js">
</SCRIPT>
<SCRIPT>

```
JSBrowser=new BrowserObj(null,!POP,TFILE,
    LARGEFONT);
</SCRIPT>
```

At step 202 in FIG. 4, the client opens the browser dialog by instantiating a new instance of the browser object with a predefined boolean constant POP, as follows:

```
<INPUT TYPE=TEXT NAME="pathcntrl">
<INPUT TYPE=BUTTON OnClick="JSBrowser=new
    BrowserObj(pathcntrl, POP,TFILE,LARGEFONT);">
```

The variable "pathcntrl" refers to a text field within an HTML form that will be populated by the results of the browser. "POP" is a constant to indicate whether the dialog should be launched. "TFILE" is a constant to indicate if the user is selecting a file or a directory. "LARGEFONT" is a constant that affects the dialog size.

At step 204, the client launches the browser 120. For the initial launch, the browser dialog 122 displays the last directory path viewed at the client computer (step 206 in FIG. 4). The last path is retrieved from a cookie stored the last time the administrator launched the browser.

Figure 5:
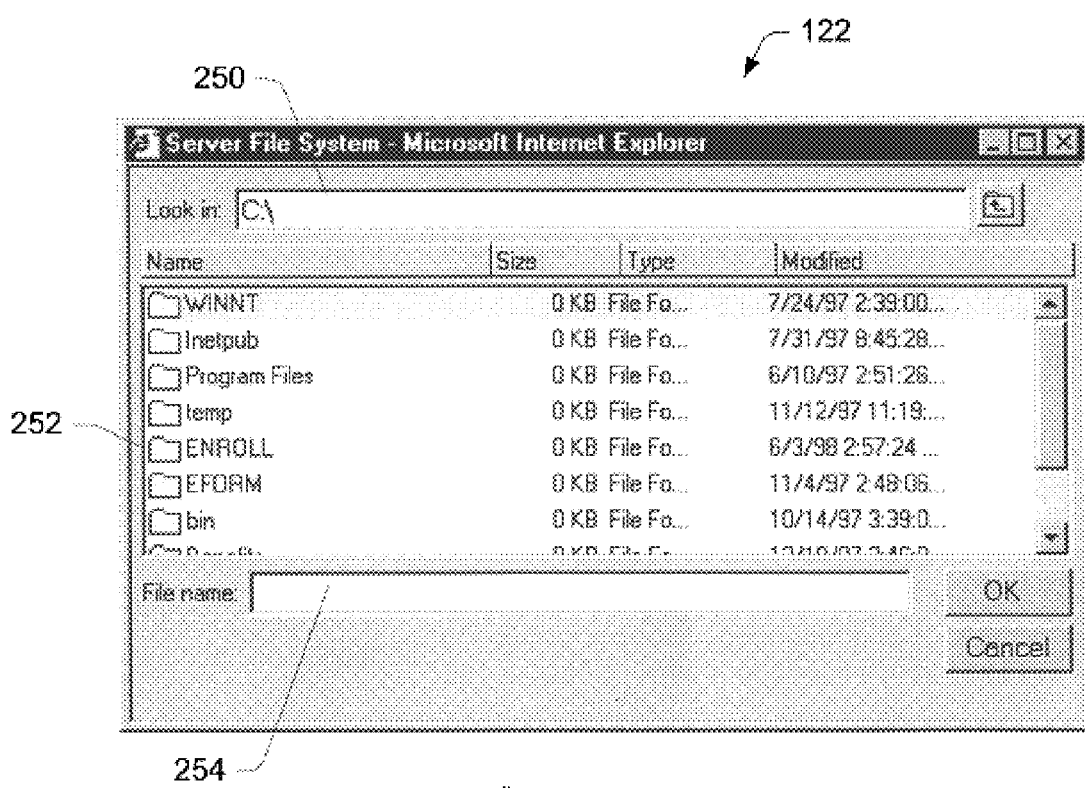
FIG. 5 shows a browser dialog user interface presented on a client computer to browse and remotely administer the server-based file system.

FIG. 5 shows the browser dialog 122 as it is rendered on the client computer monitor. The browser dialog 122 resembles the familiar file management UI supported by Windows-brand operating systems. It includes a "Look in:" text box 250, a file list 252, and a "File name:" text box 254. When first opened, the dialog 122 displays the last directory path, which in this case is "C:", in the "Look in:\" text box 250. Within the dialog 122, the administrator may navigate up or down the directory structure by either entering a path into the "Look in:" text box 250 or selecting an item in the file list 252. The dialog 122 can also display directory view that has a hierarchical directory tree instead of, or in addition to, the list of flies.

With reference again to FIG. 4, if the user selects an item in the list 252 (i.e., the "yes" branch from step 208), the browser 120 determines whether the contents are cached locally on the client (step 210). If they are, the browser 120 refreshes the page (step 212). The new page indicates that the item is selected in some manner, such as changing the color of the selected item or displaying a gray background, and shows the path of the selected item in the "File name:" text box 254 at the bottom of the dialog. If the selected item is a folder, its contents will be enumerated and displayed in the list 252 and the "Look in:" text box 250 will be updated with the new path.

When the administrator finally selects an item or enters a path that is not cached locally (e.g., a folder), the browser passes a text string of the path back to the instantiating form's path text box, as specified in the initial browser call. The path is then passed as a query string via an HTTP request to the server (step 214 in FIG. 4). Because the path is carried in an HTTP request, it passes through the firewall 32 to the server 22.

The parsing script 118, which runs at the server in the context of authenticated users, receives and parses the request (step 216). Recognizing the path query as pertaining to the file system, the script 110 invokes the file system object 114 and derives a new object based upon the posted path (step 218). The file system determines whether the path is a real path within the physical directories (step 220). If the path is not contained in the physical directories (i.e., the "no" branch from step 220), the server returns an error message in an HTTP response to the client (step 222). On the other hand, if the path exists (i.e., the "yes" branch from step 220), the file system object 114 enumerates the files or directories in the path (step 224).

At step 226, the server side ASP script 118 creates a formatted dialog to return to the client browser. The ASP script creates a client-side script, which instantiates a custom client-side object to cache the returned file data such as the file name, last date modified, file size, and so forth. That is, the server generates the program that enables creation of an object on the client side to handle the response to the file directory query. Absent this step, the client-side browser does not know what files, folders, or directories it will cache. The server thus prepares a client-side script that will be able to cache the information for the client and downloads that script to the client for execution. An example of a server-side script creating a client-side HTML output for execution on the client is given below under the heading "Client-side Script Generation".

At step 228, the server sends an HTTP response containing the client-side script created at the server. The client script is loaded and executed by the client to enumerate the cache with the results of the directory query (step 230). The browser dialog can then display the list of new files obtained from the server and cached locally (step 206). Because the data is cached on the client, it may be sorted or items may be selected without requiring another round trip to the server.

It is noted that the browsing process can be extended to enable remote file browsing of physical directories on another computer connected to the server 22. That is, the server 22 operates as a proxy server to facilitate browsing of other computers behind the firewall and connected via a local network. In this implementation, the file system object is invoked to enumerate the files or directories for the requested path that resides on a separate computer, such as server 34. The two local computers could use a conventional architecture, such as SMB shares or NFS shares, to support remote object transactions.

The architecture and process enable a remote administrator to browse the physical directories on the server site. In one implementation, the architecture enables an administrator to browse and view both physical and virtual directories in a single integrated namespace that reflects the hierarchical arrangement of the site as perceived by the client. The remote administration tool includes a dynamic namespace integration mechanism that looks up information maintained in a registry (e.g., metabase) for the physical and virtual directories and maps the virtual directories to their appropriate actual locations as necessary. The administrator then has a view of the site that corresponds to the view of the client browsing the site, i.e., in a hierarchy of the physical directories and the virtual directories mirroring the hierarchy of the URLs. The administrator may then manage the files under the directories in the namespace via the same entity, such as by setting property values via a user interface of a management tool. Moreover, the hierarchical relationships between the physical and virtual directories enable the properties to inherit properties set on their parent nodes, simplifying management tasks. These properties can span from virtual directories to physical directories or physical directories to virtual directories.

The namespace integration mechanism is described in detail in a co-pending U.S. patent application Ser. No. 09/105,398, entitled "Integration of Physical and Virtual Namespace", which was filed Jun. 26, 1998 in the names of Ronald Meijer, Douglas C. Hebenthal, Lara N. Dillingham, Kim A. Stebbens, James D. Jacoby, and Anthony C. Romano. The application is assigned to Microsoft Corporation and is hereby incorporated by reference.

The above description focuses on remote file management using an HTML browser. It is noted that aspects of this invention may be extended to enable remote management of other local system resources, such as IP addresses, printers, and so forth. Messages in the form of HTTP requests can be sent across and handled by server-side scripts. The scripts pass the messages onto the appropriate system resource. Then, when constructing a response, the server-side script generates a client-side script to be downloaded to the client to instantiate an object containing the requested data concerning the local system resource.

Example of Server-Side Generation of Client-Side Script

One of the aspects of the remote browsing process is that a server-side script creates on behalf of the client a client-side script that instantiates a custom client-side object to cache the returned file data. As one example, a server-side ASP file "jsbrwset.asp" is executed to create a set of files and/or folders from the server files system that can be cached at the client. The server-side ASP file is written in VBScript and, when executed, outputs a script written in JavaScript that can be executed on the client to create an object holding the file data returned in response to the browser query. The code for the ASP file is given below:

```
<%@ LANGUAGE=VBScript %>
<% Option Explicit %>
<% Response.Expires = 0 %>
<%
    Const L_PATHNOTFOUND_TEXT = "The path was not found."
    Const L_SLASH_TEXT = "\"
    Const TDIR = 0
    Const TFILE = 1
    Const FIXEDDISK = 2
    Dim i, newid,path, f, sc, fc, fl, FileSystem,btype,drive, drives
    Dim primarydrive
    bType = Clnt(Request.Querystring("btype"))
    Set FileSystem=CreateObject("Scripting.FileSystemObject")
    Set drives = FileSystem.Drives
    For Each drive in drives
        primarydrive = drive
        'exit after the first FIXEDDISK if there is one . . .
        if drive.DriveType = FIXEDDISK then
            Exit For
        end if
    Next
    primarydrive = primarydrive & L_SLASH_TEXT
    newid = 0
    If Request.QueryString("path") <>" " Then
        path = Request.QueryString("path")
        if FileSystem.FolderExists(path) then
            Response.Cookies("HTMLA")("LASTPATH")=path
        end if
    Else
        path = Request.Cookies("HTMLA")("LASTPATH")
    End If
    If path = " "Then
        Response.Cookies("HTMLA")("LASTPATH")=primarydrive
        path = primarydrive
    End If
%>
<HTML>
<HEAD>
<SCRIPT LANGUAGE="JavaScript">
    <% if FileSystem.FolderExists(path) then %>
        top.main.head.cachedList = new Array( );
        cachedList = top.main.head.cachedList;
    <%
    Set f=FileSystem.GetFolder(path)
        Set sc = f.SubFolders
        For Each i In sc
            if i.Attributes AND 2 then
            else
            %>
                cachedList[<%= newid %>]= new
                    top.main.head.listObj("<%= Replace(i,"\","\\")
                    %>","<%= i.name %>"," "," ","<%= i.Type
```

-continued

```
                    %>","<%= i.DateLastModified %>",true);
                <%
                newid = newid + 1
                end if
        Next
        if bType = TFILE then
            Set fc = f.Files
            For Each fl in fc
                if fl.Attributes AND 2 then
                else
                    %>
                    cachedList[<%= newid %>]= new
                        top.main.head.listObj("<%= Replace(i,"\","\\")
                        %>","<%= fl.name %>"," ","<%= fl.size
                        %>","<%= fl.Type %>","<%=
                        fl.DateLastModified %>",false);
                    <%
                    newid = newid + 1
                end if
            Next
        end if
    %>
        top.main.head.listFunc.selIndex=0;
        top.main.list.location.href ="JSBrwLs.asp";
    <% else %>
alert(top.main.head.document.userform.currentPath.value+"\r\r<%=
    L_PATHNOTFOUND_TEXT %>");
top.main.head.document.userform.currentPath.value = "<%=
    Replace(Request.Cookies("HTMLA")("LASTPATH"),"\","\\") %>";
    <% end if %>
</SCRIPT>
</HEAD>
<BODY>
</BODY>
</IHTML>
```

Notice that the end of the code contains instructions to create an HTML form written in JavaScript. Execution of the ASP file thereby creates an HTML form having a cached list of files/folders returned by the file system object. The HTML form output as a result of executing the ASP file is as follows:

```
top.main.head.cachedList = new Array( ); cachedList =
top.main.head.cachedList;
    cachedList[0]= new
top.main.head.listObj("C:\\WINNT","WINNT"," "," ","File Folder",
"7/24/97 2:39:00 PM",true);
    cachedList[1]= new
top.main.head.listObj("C:\\Inetpub","Inetpub"," "," ","File Folder",
"7/31/97 8:45:28 PM",true);
    cachedList[2]= new top.main.head.listObj("C:\\Program Files",
"Program Files"," "," ","File Folder","6/10/97 2:51:26 PM",true);
    cachedList[3]= new top.main.head.listObj("C:\\temp","temp"," "," ",
"File Folder","11/12/97 11:19:54 PM",true);
    cachedList[4]= new
top.main.head.listObj("C:\\ENROLL","ENROLL"," "," ","File Folder",
"6/3/98 2:57:24 PM",true);
    cachedList[5]= new
top.main.head.listObj("C:\\EFORM","EFORM"," "," ","File Folder",
"11/4/97 2:48:06 PM",true);
    cachedList[6]= new top.main.head.listObj("C:\\bin","bin"," "," ",
"File Folder","10/14/97 3:39:00 PM",true);
    cachedList[7]= new
top.main.head.listObj("C:\\Benefits","Benefits"," "," ","File Folder",
"12/19/97 3:46:06 PM",true);
    cachedList[8]= new top.main.head.listObj("C:\\MLO","MLO"," "," ",
"File Folder","1/12/98 3:19:30 PM",true);
    cachedList[9]= new top.main.head.listObj("C:\\Multimedia
Files","Multimedia Files"," "," ","File Folder",
"7/28/97 5:54:30 PM",true);
    top.main.head.listFunc.selIndex=0; top.main.list.location.href
="JSBrwLs.asp";
```

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. In a client-server computer system, a method for browsing server-based physical file directories remotely from a client over a network, comprising the following steps:

submitting a directory path in a request from the client to the server, the directory path specifying a path in the physical file directories;

generating directory data pertaining to files and/or folders enumerated for the directory path;

creating client-side executable code for execution on the client to cache the directory data at the client; and returning the executable code and the directory data from the server to the client.

2. A method as recited in claim 1, further comprising the step of executing the executable code at the client to cache the directory data at the client.

3. A method as recited in claim 2, further comprising the step of displaying the directory data at the client.

4. A method as recited in claim 2, further comprising the step of listing the files and/or folders in a graphical user interface at the client.

5. A method as recited in claim 2, further comprising the step of displaying a representation of the file directories in a graphical user interface at the client.

6. A method as recited in claim 1, further comprising the step of executing the executable code at the client to build a graphical user interface and to present the directory data within the graphical user interface at the client.

7. A method as recited in claim 6, further comprising the step of navigating the directory data within the graphical user interface.

8. A method as recited in claim 1, wherein the submitting step comprises the step of sending the directory path as a text string in an HTTP request.

9. Computer-readable mediate distributed at the client and the server to store computer-executable instructions for performing the steps as recited in claim 1.

10. In a client-server computer system in which a client submits a request to browse a server-based file directory, a method for handling the client request at the server, comprising the following steps:

extracting a directory path from the request;

enumerating any files and/or folders for the directory path;

creating executable code for execution on the client to cache directory data pertaining to the enumerated files and/or folders at the client; and returning the executable code and the directory data to the client.

11. A method as recited in claim 10, further comprising the step of determining whether the directory path exists.

12. A remote file administration architecture embodied on computer-readable media for execution in a client-server system, the architecture comprising:

client-side code resident at a client to enable a user to designate a path of a physical file directory located at a server and to send a client request that includes the path to the server; and server-side code resident at the server to receive the client request and to generate directory data pertaining to files and/or folders for the directory path, the server-side code generating client-side executable code for execution on the client to cache the directory data at the client and returning the executable code and the directory data to the client.

13. A remote file administration architecture as recited in claim 12, wherein the client-side code comprises a Web browser and a graphical user interface to present and enable navigation of the directory data.

14. A remote file administration architecture as recited in claim 12, wherein the server-side code comprises a Web server, a file system interface, and a script to generate the client-side executable code.

15. A remote file administration architecture as recited in claim 12, wherein the request conforms to HTTP.

16. A remote file administration architecture embodied on computer-readable media for execution in a client-server system having a client computer connected to a server computer via a public network, the server having a file system with files and/or folders arranged in physical directories, the architecture comprising:

a client browser resident at a client;

a client user interface to enable a user to designate a path of a physical file directory located at the server;

the client browser being configured to send a client request that includes the path to the server; and a server program resident at the server to receive the client request and to direct the file system to enumerate the files and/or folders for the directory path contained in the request, the server program generating executable code that can be executed on the client to cache directory data enumerated by the file system at the client.

17. A remote file administration architecture as recited in claim 16, wherein the request conforms to HTTP.

18. A remote file administration architecture as recited in claim 16, wherein the server program returns the executable code and the directory data to the client.

19. A server software system embodied on a computer-readable medium and implemented in a server connected to serve one or more clients, the server having a file system with files and/or folders arranged in physical directories, the server software system comprising:

code means for receiving a client request to browse the file system, the client request specifying a directory path of a physical directory;

code means for enumerating any files and/or folders for the directory path;

code means for creating client-side executable code for execution on the client to cache directory data pertaining to the enumerated files and/or folders at the client; and code means for returning the executable code and the directory data to the client.

20. A server software system as recited in claim 19, further comprising code means for determining whether the directory pass exists.

21. A server operating system comprising the server software system as recited in claim 19.

22. A network system comprising:

a client computer having a processing unit, a memory, and a browser stored in the memory and executable on the processing unit;

a server computer having a processing unit and memory;

a file system implemented on the server computer and having files and/or folders organized in directories and stored within the server memory;

a server program stored in the server memory and executable on the processing unit to receive requests from the browser on the client computer and to return responses to the browser;

the browser being configured to send a request to the server computer, the request specifying a directory path within the physical directories of the file system; and the server program being configured to obtain directory data for the directory path from the file system and to create client-side executable code for execution on the client computer to cache the directory data locally at the client, the server program returning the executable code and the directory data to the client.

23. A network system as recited in claim 22, wherein the client browser communicates with the server program using HTTP messages.

* * * * *

UNITED STATES PATENT AND TRADEMARK OFFICE
CERTIFICATE OF CORRECTION

PATENT NO. : 6,327,608 B1  
DATED : December 4, 2001  
INVENTOR(S) : Dillingham

It is certified that error appears in the above-identified patent and that said Letters Patent is hereby corrected as shown below:

Column 1,
Line 49, delete "lo" after "and".

Signed and Sealed this

Ninth Day of July, 2002

Attest:

JAMES E. ROGAN
Attesting Officer   Director of the United States Patent and Trademark Office